March 1, 1938.  C. F. ANDERSON  2,109,629
MILK BOTTLE
Filed Sept. 23, 1936

Inventor
Clarence F. Anderson

By Clarence A. O'Brien
Hyman Berman
Attorneys

Patented Mar. 1, 1938

2,109,629

UNITED STATES PATENT OFFICE 2,109,629

MILK BOTTLE

Clarence F. Anderson, Chicago, Ill.

Application September 23, 1936, Serial No. 102,190

2 Claims. (Cl. 220—65)

This invention appertains to new and useful improvements in receptacles and more particularly to a receptacle especially adapted for containing milk or like liquid.

The principal object of the present invention is to provide a non-breakable bottle especially adapted for containing milk.

Another important object of the invention is to provide a non-breakable bottle which can be conveniently provided with a sanitary lining.

These and various other objects and advantages of the invention will become apparent to the reader of the following specification.

In the drawing:—

Figures 1, 2:
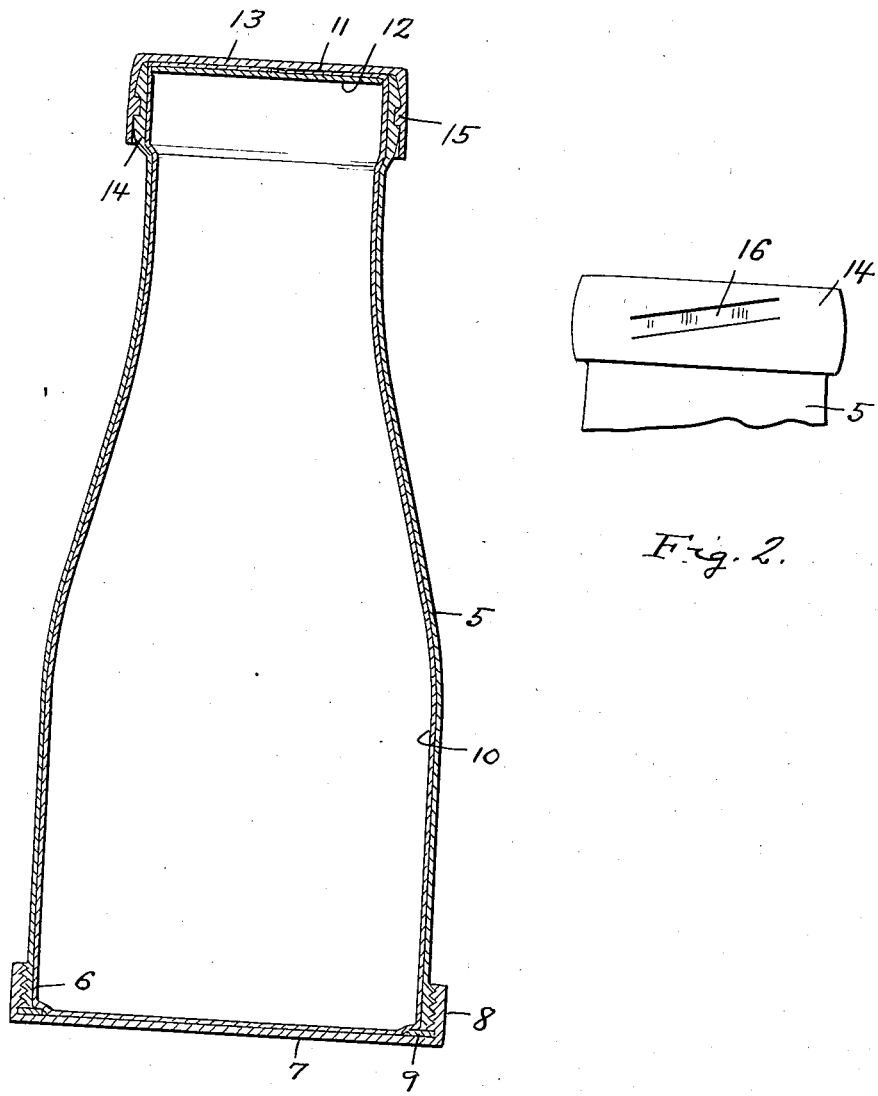
Figure 1 represents a vertical sectional view through the improved bottle.
Fig. 2 represents a fragmentary side elevational view of the upper portion of the bottle with the cap removed.

Referring to the drawing wherein like numerals designate like parts, it can be seen that numeral 5 represents the bottle shell or bottle proper which is generally in the shape of a milk bottle and is constructed of metal.

The lower portion of this shell 5 is provided with a circumferentially extending threaded shoulder 6, the bottom of the shell 5 being open. Numeral 7 represents a removable bottom for the shell 5. This bottom is of metal and provided with the upstanding internally threaded wall structure 8 for engagement with the threaded shoulder 6. A suitable washer or gasket 9 is interposed between the bottom 7 and the lower edge of the shell 5.

Obviously the removable bottom 7 is provided so that the paper lining or carton 10 can be readily removed. This paper container 10 is of a shape to snugly fit within the shell 5, the same extending clear to the top of the shell 5 where it is provided with thin flap portions 11 which can be disposed over the closure disk 12 frictionally fitting into the top of the container 10. Numeral 13 represents a skirted cap for snug disposition over the thickened portion 14 of the shell 5, the skirt portion being provided with studs 15 which can ride in the grooveways 16 of the portion 14 of the shell so as to cam the cap snugly into position over the upper end of the shell.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:—

1. A receptacle comprising a bottle-like metallic shell having an open upper end, a similarly shaped lining of semi-flexible material removably mounted in said shell to fit snugly therein and provided at its top with a pair of closure flaps adapted to fold down in edge-to-edge relation, a closure disk frictionally fitting into the upper end of said lining beneath said flaps, and means to close the upper end of said shell comprising a flanged closure cap and cooperating pin and cam slot devices on said flange and shell respectively.

2. A receptacle comprising a bottle-like metallic shell having upper and lower open ends, a similarly shaped lining of semi-flexible material removably mounted in said shell to fit snugly therein and provided at its top with a pair of closure flaps adapted to fold down in edge to edge relation, a closure disk frictionally fitting into the upper end of said lining beneath said flaps, means to close the upper end of said shell comprising a flanged closure cap and cooperating pin and cam slot devices on said flange and shell, respectively, and a closure cap for the lower end of the shell threaded onto the latter for removal therefrom to provide for removal of said lining.

CLARENCE F. ANDERSON.